US012811068B2

(12) United States Patent
Sugita

(10) Patent No.: US 12,811,068 B2
(45) Date of Patent: Nov. 24, 2026

(54) MULTILAYER CERAMIC CAPACITOR INCLUDING DIELECTRIC LAYERS WITH DIFFERENT THICKNESSES AND INCLUDING CERAMIC MATERIAL WITH DIFFERENT PARTICLE SIZES

(71) Applicant: Murata Manufacturing Co., Ltd., Nagaokakyo (JP)

(72) Inventor: Hiroaki Sugita, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 61 days.

(21) Appl. No.: 18/817,544

(22) Filed: Aug. 28, 2024

(65) Prior Publication Data

US 2024/0420896 A1 Dec. 19, 2024

Related U.S. Application Data

(63) Continuation of application No. PCT/JP2023/020145, filed on May 30, 2023.

(30) Foreign Application Priority Data

Jun. 3, 2022 (JP) ................................ 2022-090973

(51) Int. Cl.
*H01G 4/30* (2006.01)
*H01G 4/012* (2006.01)
(Continued)

(52) U.S. Cl.
CPC ............... *H01G 4/30* (2013.01); *H01G 4/012* (2013.01); *H01G 4/1209* (2013.01); *H01G 4/2325* (2013.01); *H01G 4/0085* (2013.01)

(58) Field of Classification Search
CPC ...... H01G 4/30; H01G 4/0085; H01G 4/2325; H01G 4/1209; H01G 4/012
See application file for complete search history.

(56) References Cited

U.S. PATENT DOCUMENTS

2011/0110014 A1 5/2011 Hirata et al.
2012/0307417 A1 12/2012 Kim et al.
(Continued)

FOREIGN PATENT DOCUMENTS

CN 114446649 A 5/2022
JP H08306580 A 11/1996
(Continued)

OTHER PUBLICATIONS

International Search Report in PCT/JP2023/020145, mailed Aug. 29, 2023, 2 pages.
(Continued)

*Primary Examiner* — David M Sinclair
(74) *Attorney, Agent, or Firm* — Keating & Bennett, LLP

(57) ABSTRACT

A multilayer ceramic capacitor includes a multilayer body including an active layer portion including internal electrode layers and dielectric layers opposed to each other in a height direction. The active layer portion includes first and second lateral surface-side active layer portions, and a middle active layer portion. An average thickness in the height direction of the dielectric layers inside the first and second lateral surface-side active layer portions is smaller than an average thickness in the height direction of the dielectric layers inside the middle active layer portion. An average particle size of a ceramic material in the dielectric layers inside the first and second lateral surface-side active layer portions is larger than an average particle size of the ceramic material in the dielectric layers inside the middle active layer portion.

19 Claims, 6 Drawing Sheets

(51) Int. Cl.

| | |
|---|---|
| ***H01G 4/12*** | (2006.01) |
| ***H01G 4/232*** | (2006.01) |
| *H01G 4/008* | (2006.01) |

(56) References Cited

U.S. PATENT DOCUMENTS

| | | | | |
|---|---|---|---|---|
| 2015/0116896 | A1 | 4/2015 | Inazuka et al. | |
| 2017/0294268 | A1* | 10/2017 | Katsuta | H01G 4/232 |
| 2019/0035554 | A1 | 1/2019 | Inomata et al. | |
| 2019/0355519 | A1* | 11/2019 | Taniguchi | H01G 4/232 |
| 2020/0118761 | A1* | 4/2020 | Terashita | H01G 4/1209 |
| 2020/0312569 | A1* | 10/2020 | Uchida | H01G 4/30 |
| 2022/0139625 | A1 | 5/2022 | Lee et al. | |

FOREIGN PATENT DOCUMENTS

| | | | | | |
|---|---|---|---|---|---|
| JP | 2012253337 | A | | 12/2012 | |
| JP | 2015026841 | A | | 2/2015 | |
| JP | 2017028254 | A | * | 2/2017 | H01G 4/30 |
| JP | 2019029422 | A | | 2/2019 | |
| KR | 20110018936 | A | | 2/2011 | |

OTHER PUBLICATIONS

Official Communication issued in corresponding Indian Patent Application No. 202417069537, mailed on Aug. 19, 2026, 8 pages.

* cited by examiner

MULTILAYER CERAMIC CAPACITOR INCLUDING DIELECTRIC LAYERS WITH DIFFERENT THICKNESSES AND INCLUDING CERAMIC MATERIAL WITH DIFFERENT PARTICLE SIZES

CROSS REFERENCE TO RELATED APPLICATIONS

This application claims the benefit of priority to Japanese Patent Application No. 2022-090973 filed on Jun. 3, 2022 and is a Continuation application of PCT Application No. PCT/JP2023/020145 filed on May 30, 2023. The entire contents of each application are hereby incorporated herein by reference.

BACKGROUND OF THE INVENTION

1. Field of the Invention

The present invention relates to multilayer ceramic capacitors.

2. Description of the Related Art

In the related art, multilayer ceramic capacitors have been known. In general, multilayer ceramic capacitors each include a ceramic sintered body made of a dielectric ceramic such as barium titanate. Such a ceramic sintered body includes therein a plurality of internal electrodes which overlap with each other with a ceramic layer interposed therebetween. Furthermore, external electrodes are provided on one end surface and the other end surface of the ceramic sintered body to provide an electrical connection with the plurality of internal electrodes (for example, refer to Japanese Unexamined Patent Application Publication No. H8-306580).

However, in multilayer ceramic capacitors, various measures for maintaining high-temperature reliability are taken to satisfy moisture resistance to steam or the like and performance required even at the time of high-temperature load, and further improvement in performance is demanded.

SUMMARY OF THE INVENTION

Example embodiments of the present invention provide multilayer ceramic capacitors that are each able to improve both moisture resistance and high-temperature reliability.

An example embodiment of the present invention provides a multilayer ceramic capacitor that includes a multilayer body including a plurality of dielectric layers and a plurality of internal electrode layers laminated therein, a first main surface and a second main surface opposed to each other in a height direction, a first lateral surface and a second lateral surface opposed to each other in a width direction orthogonal or substantially orthogonal to the height direction, a first end surface and a second end surface opposed to each other in a length direction orthogonal or substantially orthogonal to the height direction and the width direction, and an active layer portion including the plurality of internal electrode layers opposed to each other in the height direction with a corresponding one of the plurality of dielectric layers interposed therebetween. The plurality of dielectric layers each include a ceramic material, the active layer portion includes a first lateral surface-side edge adjacent to the first lateral surface and extending in the height direction, a second lateral surface-side edge adjacent to the second lateral surface and extending in the height direction, a first lateral surface-side active layer portion including a region from the first lateral surface-side edge toward an inside of the active layer portion in the width direction, a second lateral surface-side active layer portion including a region from the second lateral surface-side edge toward the inside of the active layer portion in the width direction, and a middle active layer portion including a region in a vicinity of a middle portion of the active layer portion in the width direction, and an average thickness in the height direction of the plurality of dielectric layers inside the first lateral surface-side active layer portion and the second lateral surface-side active layer portion is smaller than an average thickness in the height direction of the plurality of dielectric layers inside the middle active layer portion, and an average particle size of the ceramic material in the plurality of dielectric layers inside the first lateral surface-side active layer portion and the second lateral surface-side active layer portion is larger than an average particle size of the ceramic material in the plurality of dielectric layers inside the middle active layer portion.

According to example embodiments of the present invention, it is possible to provide multilayer ceramic capacitors that are each able to improve both moisture resistance and high-temperature reliability.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Example embodiments of the present invention will be described in detail below with reference to the drawings.

Figure 1:
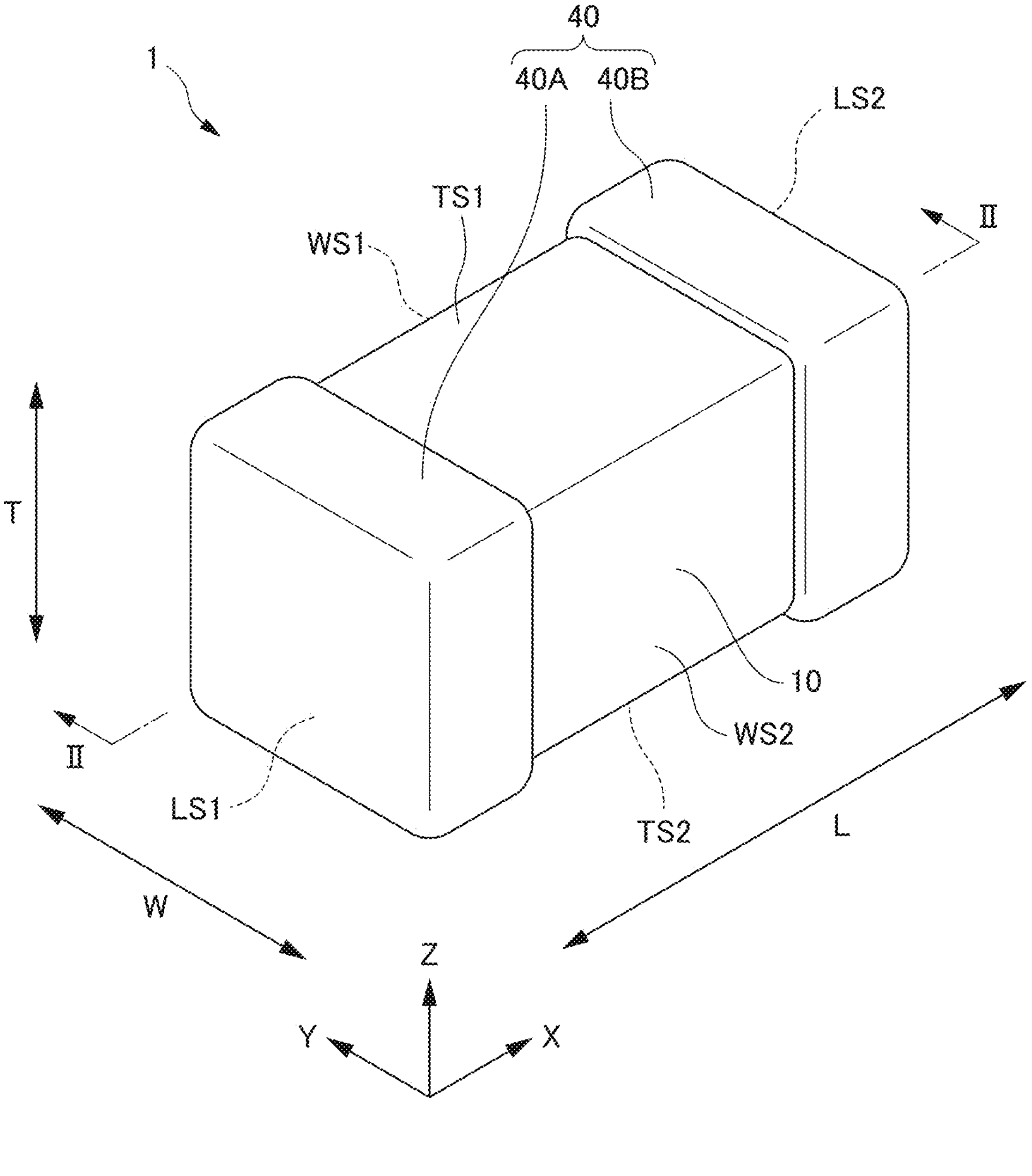
FIG. 1 is an external perspective view of a multilayer ceramic capacitor according to an example embodiment of the present invention.
Figure 2:
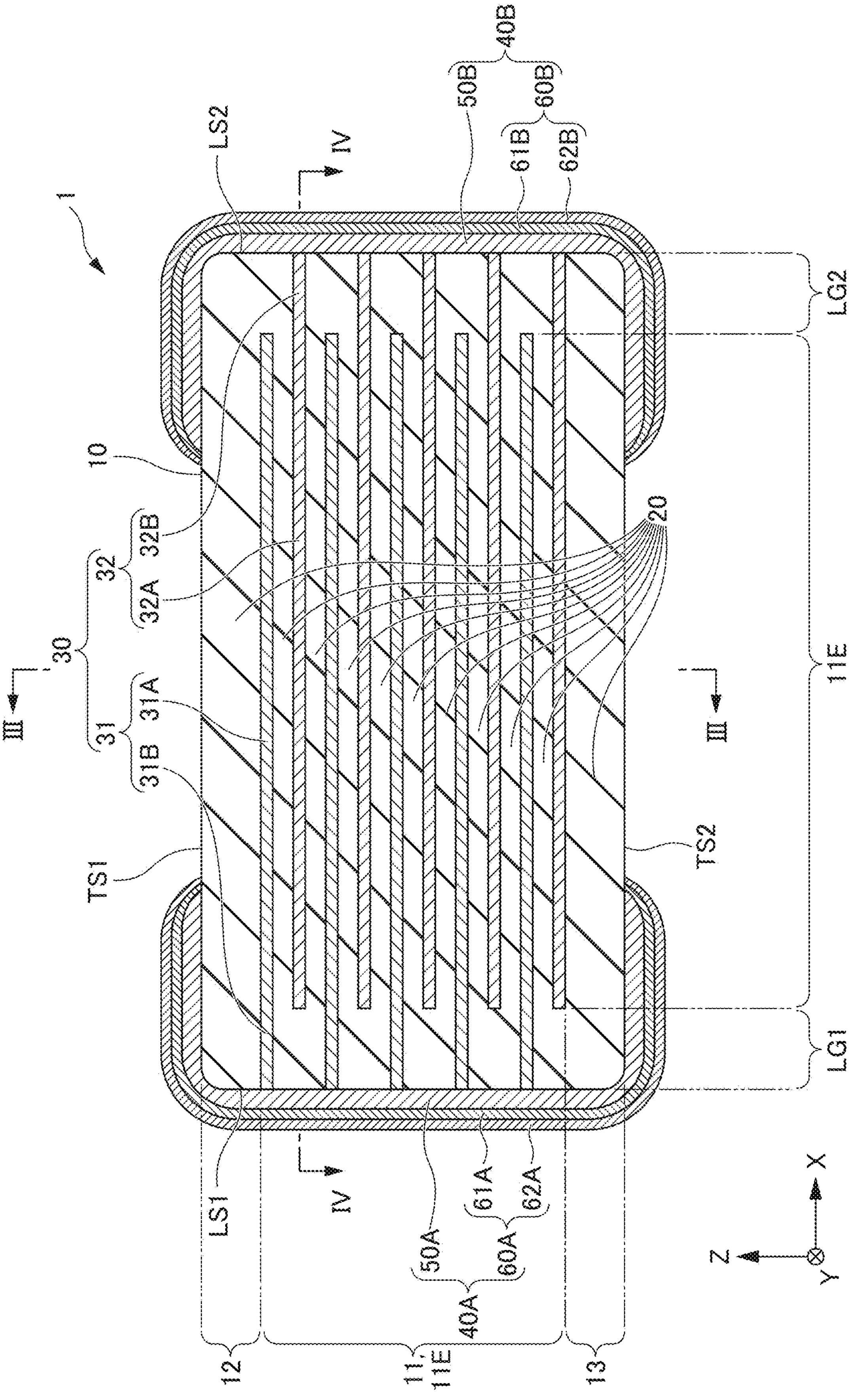
FIG. 2 is a cross-sectional view taken along the line II-II of the multilayer ceramic capacitor shown in FIG. 1.
Figure 3:
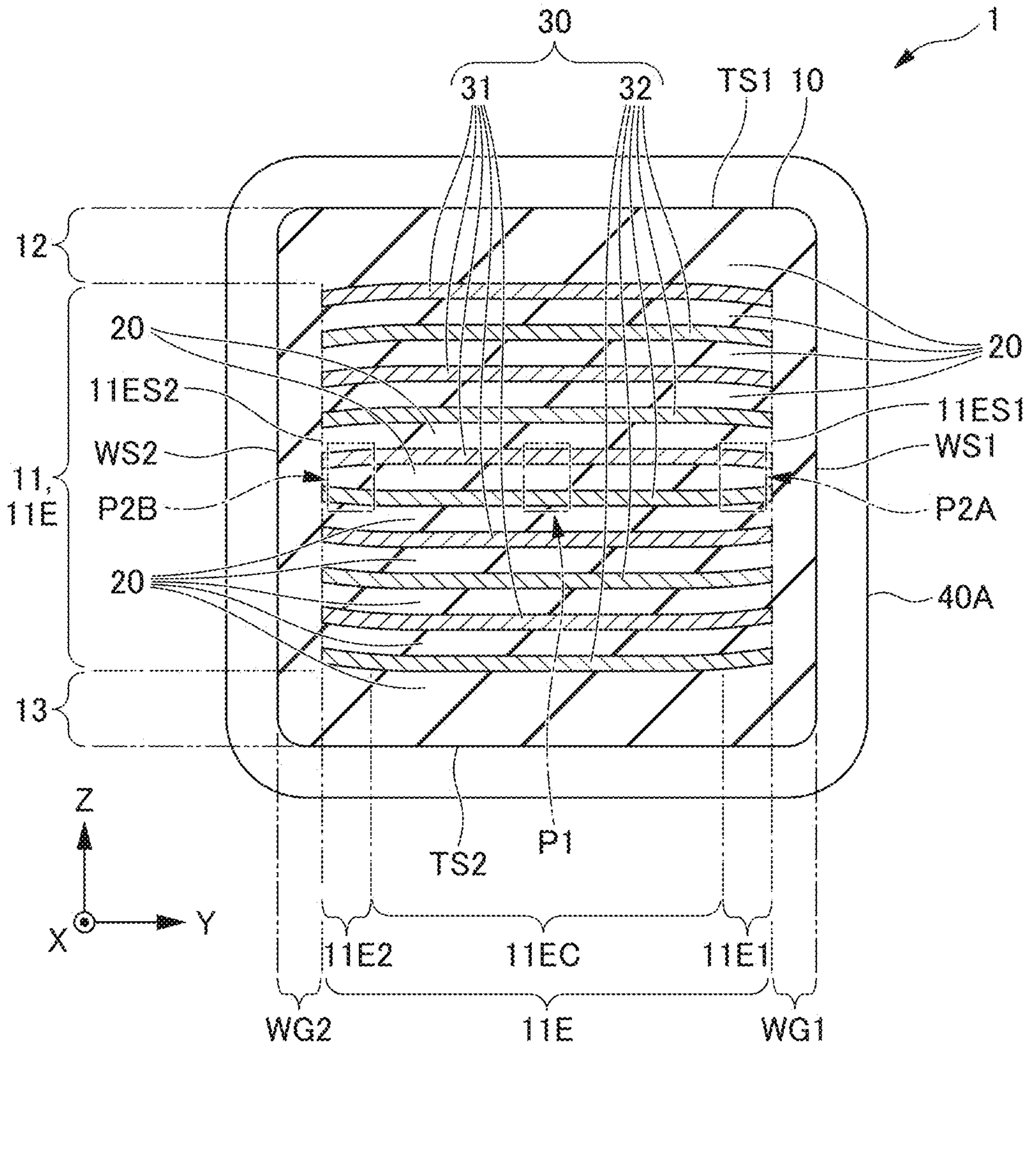
FIG. 3 is a cross-sectional view taken along the line III-III of the multilayer ceramic capacitor shown in FIG. 2.
Figure 4:
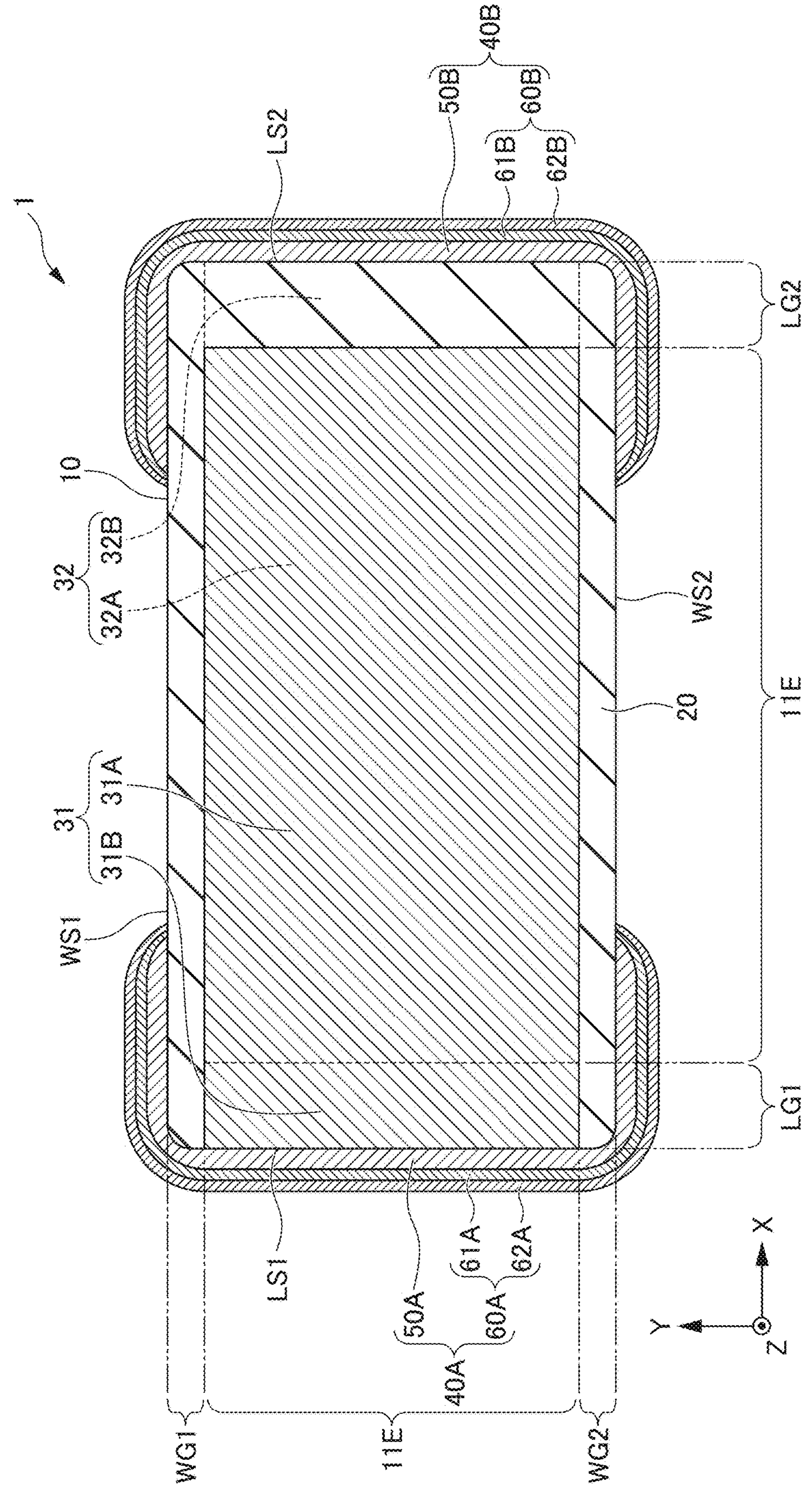
FIG. 4 is a cross-sectional view taken along the line IV-IV of the multilayer ceramic capacitor shown in FIG. 2.

A multilayer ceramic capacitor 1 according to an example embodiment of the present invention will be described. FIG. 1 is an external perspective view of a multilayer ceramic capacitor 1 of the present example embodiment. FIG. 2 is a cross-sectional view taken along the line II-II of the multilayer ceramic capacitor 1 of FIG. 1. FIG. 3 is a cross-sectional view taken along the line III-III of the multilayer ceramic capacitor 1 of FIG. 2. FIG. 4 is a cross-sectional view taken along the line IV-IV of the multilayer ceramic capacitor 1 of FIG. 2.

The multilayer ceramic capacitor 1 includes a multilayer body 10 and external electrodes 40.

FIGS. 1 to 4 show an XYZ Cartesian coordinate system. The length direction L of the multilayer ceramic capacitor 1 and the multilayer body 10 corresponds to the X direction.

The width direction W of the multilayer ceramic capacitor 1 and the multilayer body 10 corresponds to the Y direction. The height direction T of the multilayer ceramic capacitor 1 and the multilayer body 10 corresponds to the Z direction. Here, the cross section shown in FIG. 2 is also referred to as an LT cross section. The cross section shown in FIG. 3 is also referred to as a WT cross section. The cross section shown in FIG. 4 is also referred to as an LW cross section.

As shown in FIGS. 1 to 4, the multilayer body 10 includes a first main surface TS1 and a second main surface TS2 opposed to each other in the height direction T, a first lateral surface WS1 and a second lateral surface WS2 opposed to each other in the width direction W orthogonal or substantially orthogonal to the height direction T, and a first end surface LS1 and a second end surface LS2 opposed to each other in the length direction L orthogonal or substantially orthogonal to the height direction T and the width direction W.

As shown in FIG. 1, the multilayer body 10 has a rectangular or substantially rectangular parallelepiped shape. The dimension in the length direction L of the multilayer body 10 may be longer than the dimension in the width direction W. The corner portions and ridge portions of the multilayer body 10 are preferably rounded. The corner portions are portions where the three surfaces of the multilayer body intersect, and the ridge portions are portions where the two surfaces of the multilayer body intersect. In addition, unevenness or the like may be provided on a portion or the entirety of the surface of the multilayer body 10.

As shown in FIGS. 2 and 3, the multilayer body 10 includes an inner layer portion 11, and a first main surface-side outer layer portion 12 and a second main surface-side outer layer portion 13 that sandwich the inner layer portion 11 in the lamination direction T.

The inner layer portion 11 includes a plurality of dielectric layers 20 and a plurality of internal electrode layers 30. The inner layer portion 11 includes the internal electrode layers 30 from the internal electrode layer 30 located closest to the first main surface TS1 to the internal electrode layer 30 located closest to the second main surface TS2 in the height direction T. In the inner layer portion 11, the plurality of internal electrode layers 30 are opposed to each other with the dielectric layer 20 interposed therebetween. The inner layer portion 11 generates a capacitance and substantially defines and functions as a capacitor.

The plurality of dielectric layers 20 are each made of a dielectric material. For example, it is preferable that the ceramic material in each of the dielectric layers has a perovskite structure including Ba, Sr, Zr, Ti, Hf, and Si, and optionally including Ca, the number of moles of Sr/(number of moles of Ba+number of moles of Ca+number of moles of Sr) is, for example, from about 0.6 to about 0.95, and the number of moles of Zr/(number of moles of Zr+number of moles of Ti+number of moles of Hf) is, for example, from about 0.9 to about 0.98.

By selecting the above materials and compositions, good temperature characteristics can be advantageously maintained.

It is further preferable that the ceramic material in each of the dielectric layers has, for example, a perovskite structure including Ba, Sr, Zr, Ti, Hf, and Si, and optionally including Ca, and that (number of moles of Ba+number of moles of Ca+number of moles of Sr)/(number of moles of Zr+number of moles of Ti+number of moles of Hf) is, for example, about 1.00 or more and about 1.03 or less.

By selecting the materials and the compositions, oxygen defects in the dielectric can be reduced or prevented in the reducing atmosphere firing, and the reliability is further improved advantageously.

The thickness of each of the dielectric layers 20 is, for example, preferably about 0.7 μm or more and about 2.5 μm or less. The number of stacked or laminated dielectric layers 20 is, for example, preferably 10 or more and 1500 or less. The number of the dielectric layers 20 refers to the total number of dielectric layers 20 in the inner layer portion 11, and dielectric layers 20 in the first main surface-side outer layer portion 12 and the second main surface-side outer layer portion 13.

The plurality of internal electrode layers 30 include a plurality of first internal electrode layers 31 and a plurality of second internal electrode layers 32. Each of the plurality of first internal electrode layers 31 is provided on a corresponding one of the plurality of dielectric layers 20. Each of the plurality of second internal electrode layers 32 is provided on a corresponding one of the plurality of dielectric layers 20. The plurality of first internal electrode layers 31 and the plurality of second internal electrode layers 32 are alternately provided in the height direction T of the multilayer body 10 with the dielectric layers 20 interposed therebetween. Each of the plurality of first internal electrode layers 31 and each of the plurality of second internal electrode layers 32 sandwich a corresponding one of the dielectric layers 20.

Each of the first internal electrode layers 31 includes a first counter portion 31A opposed to at least one of the second internal electrode layers 32, and a first extension portion 31B extending from the first counter portion 31A toward the first end surface LS1. The first extension portion 31B is exposed at the first end surface LS1.

Each of the second internal electrode layers 32 includes a second counter portion 32A opposed to the first internal electrode layer 31, and a second extension portion 32B extending from the second counter portion 32A toward the second end surface LS2. The second extension portion 32B is exposed at the second end surface LS2.

In the present example embodiment, the first counter portion 31A and the second counter portion 32A are opposed to each other with the dielectric layer 20 interposed therebetween, such that a capacitance is generated, and the characteristics of a capacitor are provided.

The shapes of the first counter portion 31A and the second counter portion 32A are not particularly limited, but are preferably rectangular or substantially rectangular. However, the corner portions of the rectangular shape may be rounded, or the corner portions of the rectangular shape may be provided obliquely. The shapes of the first extension portion 31B and the second extension portion 32B are not particularly limited, but are preferably rectangular or substantially rectangular. However, the corner portions of the rectangular shape may be rounded, or the corner portions of the rectangular shape may be provided obliquely.

The dimension of the first counter portion 31A in the width direction W and the dimension of the first extension portion 31B in the width direction W may be the same or substantially the same, or either one of them may be smaller. The dimension of the second counter portion 32A in the width direction W and the dimension of the second extension portion 32B in the width direction W may be the same or substantially the same, or either one of them may be narrower.

The first internal electrode layers 31 and the second internal electrode layers 32 are each made of an appropriate electrically conductive material including a metal such as, for example, Ni, Cu, Ag, Pd or Au, or an alloy including at least one of these metals. When using an alloy, the first internal electrode layers 31 and the second internal electrode layers 32 may be each made of, for example, an Ag—Pd alloy.

The thicknesses of the first internal electrode layers 31 and the second internal electrode layers 32 are each preferably, for example, about 0.2 μm or more and about 1.5 μm or less. The total number of the first internal electrode layers 31 and the second internal electrode layers 32 is, for example, preferably ten or more and 1500 or less.

In addition, for example, Sn may be provided at the interface between the first internal electrode layer and the dielectric layer and the interface between the second internal electrode layer and the dielectric layer. Further, Sn may be layered or scattered. Further, Sn may form a solid solution adjacent to the internal electrode or may form a solid solution in the dielectric grains adjacent to the dielectric layer.

The first main surface-side outer layer portion 12 is located adjacent to the first main surface TS1 of the multilayer body 10. The first main surface side-outer layer portion 12 includes a plurality of dielectric layers 20 located between the first main surface TS1 and the internal electrode layer 30 closest to the first main surface TS1. The dielectric layers 20 used in the first main surface-side outer layer portion 12 may be the same as the dielectric layers 20 used in the inner layer portion 11.

The second main surface side-outer layer portion 13 is located adjacent to the second main surface TS2 of the multilayer body 10. The second main surface side-outer layer portion 13 includes a plurality of dielectric layers 20 located between the second main surface TS2 and the internal electrode layer 30 closest to the second main surface TS2. The dielectric layers 20 used in the second main surface-side outer layer portion 13 may be the same as the dielectric layers 20 used in the inner layer portion 11.

As described above, the multilayer body 10 includes the plurality of laminated dielectric layers 20 and the plurality of laminated internal electrode layers 30 on the dielectric layers 20. That is, the multilayer ceramic capacitor 1 includes the multilayer body 10 in which the dielectric layers 20 and the internal electrode layers 30 are alternately laminated.

The multilayer body 10 includes an active layer portion 11E. The active layer portion 11E is a portion where the first counter portions 31A of the first internal electrode layers 31 and the second counter portions 32A of the second internal electrode layers 32 are opposed to each other. The active layer portion 11E defines and functions as a portion of the inner layer portion 11. FIG. 4 shows the range of the active layer portion 11E in the width direction W and the length direction L. The active layer portion 11E is also referred to as a counter electrode portion or a capacitor active portion. Details of the active layer portion 11E will be described later.

The multilayer body 10 includes lateral surface-side outer layer portions. The lateral surface-side outer layer portions include a first lateral surface-side outer layer portion WG1 and a second lateral surface-side outer layer portion WG2. The first lateral surface-side outer layer portion WG1 is a portion including the dielectric layer 20 located between the active layer portion 11E and the first lateral surface WS1. The second lateral surface-side outer layer portion WG2 is a portion including the dielectric layer 20 located between the active layer portion 11E and the second lateral surface WS2. FIGS. 3 and 4 each show the ranges in the width direction W of the first lateral surface-side outer layer portion WG1 and the second lateral surface-side outer layer portion WG2. Each of the lateral surface-side outer layer portions is also referred to as a W gap or a side gap.

The multilayer body 10 includes end surface-side outer layer portions. The end surface-side outer layer portion includes a first end surface-side outer layer portion LG1 and a second end surface-side outer layer portion LG2. The first end surface-side outer layer portion LG1 is a portion including the dielectric layer 20 located between the active layer portion 11E and the first end surface LS1. The second end surface-side outer layer portion LG2 is a portion including the dielectric layer 20 located between the active layer portion 11E and the second end surface LS2. FIGS. 2 and 4 each show the ranges in the length direction L of the first end surface-side outer layer portion LG1 and the second end surface-side outer layer portion LG2. Each of the end surface-side outer layer portions is also referred to as an L gap or an end gap.

The external electrodes 40 include a first external electrode 40A provided adjacent to the first end surface LS1 and a second external electrode 40B provided adjacent to the second end surface LS2.

The first external electrode 40A is provided on the first end surface LS1. The first external electrode 40A is connected to the first internal electrode layers 31. The first external electrode 40A may be provided on a portion of the first main surface TS1 and a portion of the second main surface TS2, and also on a portion of the first lateral surface WS1 and a portion of the second lateral surface WS2. In the present example embodiment, the first external electrode 40A extends from the first end surface LS1 to a portion of the first main surface TS1 and to a portion of the second main surface TS2, and to a portion of the first lateral surface WS1 and to a portion of the second lateral surface WS2.

The second external electrode 40B is provided on the second end surface LS2. The second external electrode 40B is connected to the second internal electrode layers 32. The second external electrodes 40B may be provided on a portion of the first main surface TS1 and a portion of the second main surface TS2, and also on a portion of the first lateral surface WS1 and a portion of the second lateral surface WS2. In the present example embodiment, the second external electrode 40B extends from the second end surface LS2 to a portion of the first main surface TS1 and to a portion of the second main surface TS2, and to a portion of the first lateral surface WS1 and a portion of the second lateral surface WS2.

As described above, in the multilayer body 10, the capacitance is generated by the first counter portions 31A of the first internal electrode layers 31 and the second counter portions 32A of the second internal electrode layers 32 which are opposed to each other with the dielectric layers 20 interposed therebetween. Therefore, characteristics of the capacitor are provided between the first external electrode 40A to which the first internal electrode layers 31 are connected and the second external electrode 40B to which the second internal electrode layers 32 are connected.

The first external electrode 40A includes a first base electrode layer 50A and a first plated layer 60A provided on the first base electrode layer 50A.

The second external electrode 40B includes a second base electrode layer 50B and a second plated layer 60B provided on the second base electrode layer SOB.

The first base electrode layer 50A is provided on the first end surface LS1. The first base electrode layer 50A is connected to the first internal electrode layers 31. In the present example embodiment, the first base electrode layer 50A extends from the first end surface LS1 to a portion of the first main surface TS1 and to a portion of the second main surface TS2, and to a portion of the first lateral surface WS1 and to a portion of the second lateral surface WS2.

The second base electrode layer 50B is provided on the second end surface LS2. The second base electrode layer 50B is connected to the second internal electrode layers 32. In the present example embodiment, the second base electrode layer 50B extends from the second end surface LS2 to a portion of the first main surface TS1 and to a portion of the second main surface TS2, and to a portion of the first lateral surface WS1 and to a portion of the second lateral surface WS2. The first base electrode layer may be provided only on the surface of the first end surface of the multilayer body, and the second base electrode layer may be provided only on the surface of the second end surface of the multilayer body.

The first base electrode layer 50A and the second base electrode layer 50B of the present example embodiment are, for example, fired layers. The fired layers preferably include, for example, a metal component and a glass component. The metal component includes, for example, at least one of Cu, Ni, Ag, Pd, Ag—Pd alloys, Au, and the like. The glass component includes, for example, at least one of B, Si, Ba, Mg, Al, Li, and the like.

Each of the fired layers is obtained by, for example, applying an electrically conductive paste including glass and metal to the multilayer body and firing it. The fired layer may be obtained by simultaneously firing a multilayer chip including internal electrodes and dielectric layers and an electrically conductive paste applied to the multilayer chip, or may be obtained by firing the multilayer chip including internal electrodes and dielectric layers to obtain a multilayer body, and then applying the electrically conductive paste to the multilayer body and firing the multilayer body. When the multilayer chip including the internal electrodes and the dielectric layers and the electrically conductive paste applied to the multilayer chip are simultaneously fired, the fired layer is, for example, preferably formed by firing a material to which a dielectric material is added instead of a glass component. The fired layer may include a plurality of layers.

The thickness of the first base electrode layer 50A located on the first end surface LS1 in the length direction L is preferably, for example, about 3 μm or more and about 160 μm or less in the middle of the first base electrode layer 50A in the height direction T and the width direction W.

The thickness of the second base electrode layer 50B located on the second end surface LS2 in the length direction L is preferably, for example, about 3 μm or more and about 160 μm or less in the middle of the second base electrode layer 50B in the height direction T and the width direction W.

When providing the first base electrode layer 50A to at least one of portions of the first main surface TS1 and the second main surface TS2, the thickness in the height direction T of the first base electrode layer 50A provided at this portion is preferably, for example, about 3 μm or more and about 40 μm or less in the middle in the length direction L and the width direction W of the first base electrode layer 50A provided at this portion.

When providing the first base electrode layer 50A to portions of at least one of the first lateral surface WS1 and the second lateral surface WS2, the thickness in the width direction W of the first base electrode layer 50A provided at this portion is preferably, for example, about 3 μm or more and about 40 μm or less at the center in the length direction L and the height direction T of the first base electrode layer 50A provided at this portion.

When providing the second base electrode layer 50B to portions of at least one of the first main surface TS1 and the second main surface TS2, the thickness in the height direction T of the second base electrode layer 50B provided at this portion is preferably, for example, about 3 μm or more and about 40 μm or less at the center in the length direction L and the width direction W of the second base electrode layer 50B provided at this portion.

When providing the second base electrode layer 50B to portions of at least one of the first lateral surface WS1 and the second lateral surface WS2, the thickness in the width direction W of the second base electrode layer 50B provided at this portion is preferably, for example, about 3 μm or more and about 40 μm or less at the center in the length direction L and the height direction T of the second base electrode layer 50B provided at this portion.

The first base electrode layer 50A and the second base electrode layer 50B are not limited to the fired layers. The first base electrode layer 50A and the second base electrode layer 50B include at least one of a fired layer, an electrically conductive resin layer, a thin film layer, and the like. For example, the first base electrode layer 50A and the second base electrode layer SOB may be thin film layers. The thin film layer is formed by a thin film forming method such as sputtering or vapor deposition, for example. The thin film layer is a layer having a thickness of, for example, about 1 μm or less on which metal particles are deposited.

The first plated layer 60A covers the first base electrode layer 50A.

The second plated layer 60B covers the second base electrode layer SOB.

The first plated layer 60A and the second plated layer 60B may each include, for example, at least one of Cu, Ni, Sn, Ag, Pd, a Ag—Pd alloy, Au, and the like. The first plated layer 60A and the second plated layer 60B may each include a plurality of layers. The first plated layer 60A and the second plated layer 60B each preferably include a two-layer structure including, for example a Sn plated layer on a Ni plated layer.

In the present example embodiment, the first plated layer 60A includes a first Ni plated layer 61A, and a first Sn plated layer 62A provided on the first Ni plated layer 61A.

In the present example embodiment, the second plated layer 60B includes a second Ni plated layer 61B, and a second Sn plated layer 62B provided on the second Ni plated layer 61B.

The Ni plated layer prevents the first base electrode layer 50A and the second base electrode layer 50B from being eroded by solder when the multilayer ceramic capacitor 1 is mounted. In addition, the Sn plated layer improves solder wettability when the multilayer ceramic capacitor 1 is mounted. This facilitates mounting of the multilayer ceramic capacitor 1. The thickness of each of the first Ni plated layer 61A, the first Sn plated layer 62A, the second Ni plated layer 61B, and the second Sn plated layer 62B is, for example, preferably about 2 μm or more and about 15 μm or less.

The first external electrode 40A and the second external electrode 40B of the present example embodiment may include, for example, an electrically conductive resin layer including electrically conductive particles and a thermosetting resin. When the electrically conductive resin layer is provided as the base electrode layer (the first base electrode layer 50A and the second base electrode layer 50B), the electrically conductive resin layer may cover the fired layer, or may be provided directly on the multilayer body 10 without providing the fired layer. When the electrically conductive resin layer covers the fired layer, the electrically conductive resin layer is provided between the fired layer and the plated layer (the first plated layer 60A and the second plated layer 60B). The electrically conductive resin layer may completely cover the fired layer or may cover a portion of the fired layer.

The electrically conductive resin layer including a thermosetting resin is more flexible than an electrically conductive layer made of, for example, a plated film or a fired product of an electrically conductive paste. Therefore, even when an impact caused by physical shock or thermal cycle is applied to the multilayer ceramic capacitor 1, the electrically conductive resin layer defines and functions as a buffer layer. Therefore, the electrically conductive resin layer reduces or prevents the occurrence of cracking in the multilayer ceramic capacitor 1.

Metals of the electrically conductive particles may be, for example, Ag, Cu, Ni, Sn, Bi or alloys including them. The electrically conductive particle preferably includes Ag, for example. The electrically conductive particle is a metal powder of Ag, for example. Ag is suitable as an electrode material because of its lowest resistivity among metals. In addition, since Ag is a noble metal, it is not likely to be oxidized, and weatherability thereof is high. Therefore, the metal powder of Ag is suitable as the electrically conductive particle.

Furthermore, the electrically conductive particle may be a metal powder coated on the surface of the metal powder with Ag. When using these coated with Ag on the surface of the metal powder, the metal powder is, for example, preferably Cu, Ni, Sn, Bi, or an alloy powder thereof. In order to make the metal of the base material inexpensive while keeping the characteristics of Ag, it is preferable to use a metal powder coated with Ag.

Furthermore, the electrically conductive particle may be formed by, for example, subjecting Cu and Ni to an oxidation prevention treatment. Furthermore, the electrically conductive particle may be a metal powder coated with Sn, Ni, and Cu on the surface of the metal powder. When using these coated with Sn, Ni, and Cu on the surface of the metal powder, the metal powder is preferably, for example, Ag, Cu, Ni, Sn, Bi, or an alloy powder thereof.

The shape of the electrically conductive particle is not particularly limited. For the electrically conductive particle, a spherical metal powder, a flat metal powder, or the like can be used. However, it is preferable to use a mixture of a spherical metal powder and a flat metal powder.

The electrically conductive particles included in the electrically conductive resin layer mainly ensure the conductivity of the electrically conductive resin layer. Specifically, by a plurality of electrically conductive particles being in contact with each other, an energization path is provided inside the electrically conductive resin layer.

The resin of the electrically conductive resin layer may include, for example, at least one of a variety of known thermosetting resins such as epoxy resin, phenolic resin, urethane resin, silicone resin, polyimide resin, and the like. Among these, epoxy resin is excellent in heat resistance, moisture resistance, adhesion, etc., and thus is one of the preferable resins. Furthermore, it is preferable that the resin of the electrically conductive resin layer include a curing agent together with a thermosetting resin. When epoxy resin is used as a base resin, the curing agent for the epoxy resin may be various known compounds such as, for example, phenols, amines, acid anhydrides, imidazoles, active esters, and amide-imides.

The electrically conductive resin layer may include a plurality of layers. The thickest portion of the electrically conductive resin layer is, for example, preferably about 10 μm or more and about 150 μm or less.

In addition, the first plated layer 60A and the second plated layer 60B described later may be directly provided on the multilayer body 10 without providing the first base electrode layer 50A and the second base electrode layer 50B. That is, the multilayer ceramic capacitor 1 may include plated layers that are directly electrically connected to the first internal electrode layers 31 and the second internal electrode layers 32. In such a case, the plated layers each may be provided, as a pretreatment, after the catalyst is provided on the surface of the multilayer body 10.

In this case as well, the plated layer preferably includes a plurality of layers. Each of the lower plated layer and the upper plated layer preferably include, for example, at least one of Cu, Ni, Sn, Pb, Au, Ag, Pd, Bi, or Zn, or an alloy containing these metals. The lower plated layer is, for example, more preferably formed using Ni having solder barrier performance. The upper plated layer is, for example, more preferably formed using Sn or Au, which have good solder wettability. In addition, for example, when the first internal electrode layers 31 and the second internal electrode layers 32 are formed using Ni, the lower plated layer is preferably formed using Cu, which has good bonding property with Ni. The upper plated layer may be formed as necessary, and each of the external electrodes 40 may include only the lower plated layer. The upper plated layer may be the outermost layer, or another plated layer may be further formed on the surface of the upper plated layer.

The thickness per layer of the plated layer provided without the base electrode layer is, for example, preferably about 1 μm or more and about 15 μm or less. The plated layer preferably does not include glass. The metal ratio per unit volume of the plated layer is, for example, preferably about 99% by volume or more.

When the plated layer is directly provided on the multilayer body 10, it is possible to reduce the thickness of the base electrode layer. Therefore, since the thickness of the base electrode layer is reduced, it is possible to reduce the dimension of the multilayer ceramic capacitor 1 in the height direction T, and it is also possible to reduce the height of the multilayer ceramic capacitor 1. Alternatively, it is possible to improve the thickness of the element body by increasing the thickness of each of the dielectric layers 20 sandwiched between the first internal electrode layer 31 and the second internal electrode layer 32 by an amount corresponding to the reduction amount in the thickness of the base electrode layer. As described above, by directly providing the plated layer on the multilayer body 10, it is possible to improve the degrees of freedom in design of the multilayer ceramic capacitor.

When the dimension in the length direction of the multilayer ceramic capacitor 1 including the multilayer body 10 and the external electrodes 40 is defined as an L dimension, the L dimension is, for example, preferably about 0.2 mm or more and about 3.6 mm or less. When the dimension in the height direction of the multilayer ceramic capacitor 1 is defined as a T dimension, the T dimension is, for example, preferably about 0.1 mm or more and about 2.6 mm or less. When the dimension in the width direction of the multilayer ceramic capacitor 1 is defined as a W dimension, the W dimension is, for example, preferably about 0.1 mm or more and about 2.6 mm or less.

Next, details of the active layer portion 11E will be described. As shown in FIG. 3, the active layer portion 11E includes a first lateral surface-side edge 11ES1 and a second lateral surface-side edge 11ES2. The first lateral surface-side edge 11ES1 is adjacent to the first lateral surface WS1 and extends in the height direction T along the end portion of each of the plurality of internal electrode layers 30 adjacent to the first lateral surface WS1. The second lateral surface-side edge 11ES2 is adjacent to the second lateral surface WS2 and extends in the height direction T along the end portion of each of the plurality of internal electrode layers 30 adjacent to the second lateral surface WS2.

Further, the active layer portion 11E includes a first lateral surface-side active layer portion 11E1, a second lateral surface-side active layer portion 11E2, and a middle active layer portion 11EC. The first lateral surface-side active layer portion 11E1 is a region of the active layer portion 11E from the first lateral surface-side edge 11ES1 toward the inside of the active layer portion 11E in the width direction W. The second lateral surface-side active layer portion 11E2 is a region of the active layer portion 11E from the second lateral surface-side edge 11ES2 toward the inside of the active layer portion 11E in the width direction W. The middle active layer portion 11EC is a region of the active layer portion 11E in the vicinity of the middle portion in the width direction W.

Here, in the plurality of dielectric layers 20, the thickness in the height direction T of each of the dielectric layers 20 inside the first lateral surface-side active layer portion 11E1 and the second lateral surface-side active layer portion 11E2 is thinner than the thickness in the height direction T of each of the dielectric layers 20 inside the middle active layer portion 11EC. That is, the first lateral surface-side active layer portion 11E1 and the second lateral surface-side active layer portion 11E2 (hereinafter, also collectively referred to as lateral surface-side active layer portions) are portions in which the thickness in the height direction T of each of the dielectric layers 20 existing therein is thinner than the thickness in the height direction T of each of the dielectric layers 20 existing inside the middle active layer portion 11EC.

The thickness of each of the dielectric layers 20 in the height direction T continuously decreases in the width direction W in the first lateral surface-side active layer portion 11E1 from the boundary with the middle active layer portion 11EC toward the first lateral surface-side edge 11ES1. The thickness of each of the dielectric layers 20 in the height direction T continuously decreases in the width direction W in the second lateral surface-side active layer portion 11E2 from the boundary with the middle active layer portion 11EC toward the second lateral surface-side edge 11ES2. The region in which the thickness in the height direction T of each of the dielectric layers 20 continuously decreases is preferably provided inside the active layer portion 11E in the width direction W from the first lateral surface-side edge 11ES1 and the second lateral surface-side edge 11ES2 by a dimension of, for example, about 1% or more and about 17% or less with respect to the dimension of the active layer portion 11E in the width direction W.

With such a configuration, the dielectric layers, the internal electrodes, and the lateral surface-side outer layer portions in the vicinity of the lateral surface-side active layer portions are in a state of being appropriately compressed, such that the denseness of the lateral surface-side active layer portions are improved. Thus, it is possible to reduce or prevent moisture infiltration into the multilayer body 10. As a result, it is possible to improve the moisture resistance reliability of the multilayer ceramic capacitor 1.

The dimension of each of the first lateral surface-side active layer portion 11E1 and the second lateral surface-side active layer portion 11E2 in the width direction W is, for example, preferably about 1% or more and about 17% or less of the dimension of the active layer portion 11E in the width direction W. The dimension of each of the first lateral surface-side active layer portion 11E1 and the second lateral surface-side active layer portion 11E2 in the width direction W is, for example, more preferably about 1% or more and about 6% or less of the dimension of the active layer portion 11E in the width direction W.

When the thickness is in the above range, it is possible to appropriately maintain a range in which each of the dielectric layers is thin, and it is possible to maintain moisture resistance reliability.

The particle size of the ceramic material in the dielectric layers 20 present inside the first lateral surface-side active layer portion 11E1 and the second lateral surface-side active layer portion 11E2 is larger than the particle size of the ceramic material in the dielectric layers present inside the middle active layer portion 11EC.

The ratio of the minimum thickness in the height direction T of the dielectric layers 20 present inside the first lateral surface-side active layer portion 11E1 and the second lateral surface-side active layer portion 11E2 to the maximum particle size of the ceramic material in the dielectric layers 20 present inside the first lateral surface-side active layer portion 11E1 and the second lateral surface-side active layer portion 11E2 is, for example, preferably about 0.83 or more and about 1.82 or less. The maximum particle size refers to a value calculated according to "average value+3σ" of the particle sizes of a plurality of ceramic particles measured by a method described later. The minimum thickness refers to a value calculated according to "average value−3σ" of the thicknesses of the dielectric layers 20 measured by a method described later.

With such a configuration, it is possible to maintain the number of particles in one dielectric layer 20 in the lateral surface-side active layer portion appropriately, and it is possible to make a more uniform electric field distribution in the layers of the lateral surface-side active layer portion. As a result, it is possible to further improve high-temperature reliability.

When the ratio of the minimum thickness in the height direction T of the dielectric layers 20 present inside the lateral surface-side active layer portions to the maximum particle size of the ceramic material in the dielectric layers 20 present inside the lateral surface-side active layer portions is about 0.83 or less, the number of particles in one dielectric layer 20 inside the lateral surface-side active layer portions cannot be maintained, such that the electric field distribution inside the layers of the lateral surface-side active layer portions becomes heterogenous or uneven, and high-temperature reliability may decrease. When the above ratio is set to about 1.82 or more, the thickness of each of the dielectric layers needs to be increased, and thus the capacitance decreases accordingly.

Method of Measuring Particle Size and Thickness of Dielectric Layer

Hereinafter, an example of a method of measuring the particle size and the thickness of each of the dielectric layers 20 in the present example embodiment will be described. The particle size of the ceramic particles of the ceramic material in the dielectric layers 20 and the thickness of each of the dielectric layers 20 are measured based on observation with a scanning electron microscope (SEM).

First, the measurement target locations will be described. The SEM observation for measurement is performed on a WT cross section parallel or substantially parallel to the first end surface LS1 and the second end surface LS2 at a substantially middle position in the length direction L of the active layer portion 11E. The SEM observation of the middle active layer portion 11EC is performed on the location of P1 in the WT cross section shown in FIG. 3, more specifically, the location at the middle in the height direction T and the middle in the width direction W of the active layer portion 11E. The SEM observation of the first lateral surface-side active layer portion 11E1 and the second lateral surface-side active layer portion 11E2 is performed on the locations of P2A and P2B in the WT cross section shown in FIG. 3, more specifically, the location at the middle in the height direction T and the middle in the width direction W in the first lateral surface-side active layer portion 11E1 and the second lateral surface-side active layer portion 11E2.

An example of a method of measuring the average particle size and the maximum particle size of the ceramic material will be described. A substantially central location in the length direction L of the multilayer ceramic capacitor 1 is fractured by a knipper so that the WT cross section of the multilayer body 10 is exposed. Thereafter, the fracture surface is subjected to heat treatment at about 1000° C. for about 30 minutes, and pretreatment is performed so that the particle size can be easily observed. After the treatment by the above method, the measurement target location is photographed at a high magnification of 20,000 times using an FE-SEM. The particle size is measured by tracing the outer edges of the particles in the image photographed by analysis software, and the average value is calculated to obtain the average particle size. The maximum particle size is calculated according to "average value+3σ" of the measured values. For the middle active layer portion 11EC, these values are calculated using the image data of the location of the measurement target location P1 described above. For the first lateral surface-side active layer portion 11E1 and the second lateral surface-side active layer portion 11E2 (lateral surface-side active layer portion), these values are calculated using the two pieces of image data at the locations of the above-described measurement target locations P2A and P2B.

An example of a method of measuring the average thickness and the minimum thickness in the height direction T of the dielectric layers 20 will be described. The multilayer body 10 is hardened with a resin and polished so that a WT cross section substantially parallel to the first end surface LS1 and the second end surface LS2 is exposed. Thereafter, a measurement target location in the WT cross section of the polished multilayer body 10 is photographed at a magnification of about 5000 times using SEM.

The thicknesses of ten dielectric layers 20 (cross-sections of ten dielectric layers 20) and ten internal electrode layers 30 (cross-sections of ten internal electrode layers 30) on the photographed image are measured to calculate an average value.

Figure 5:
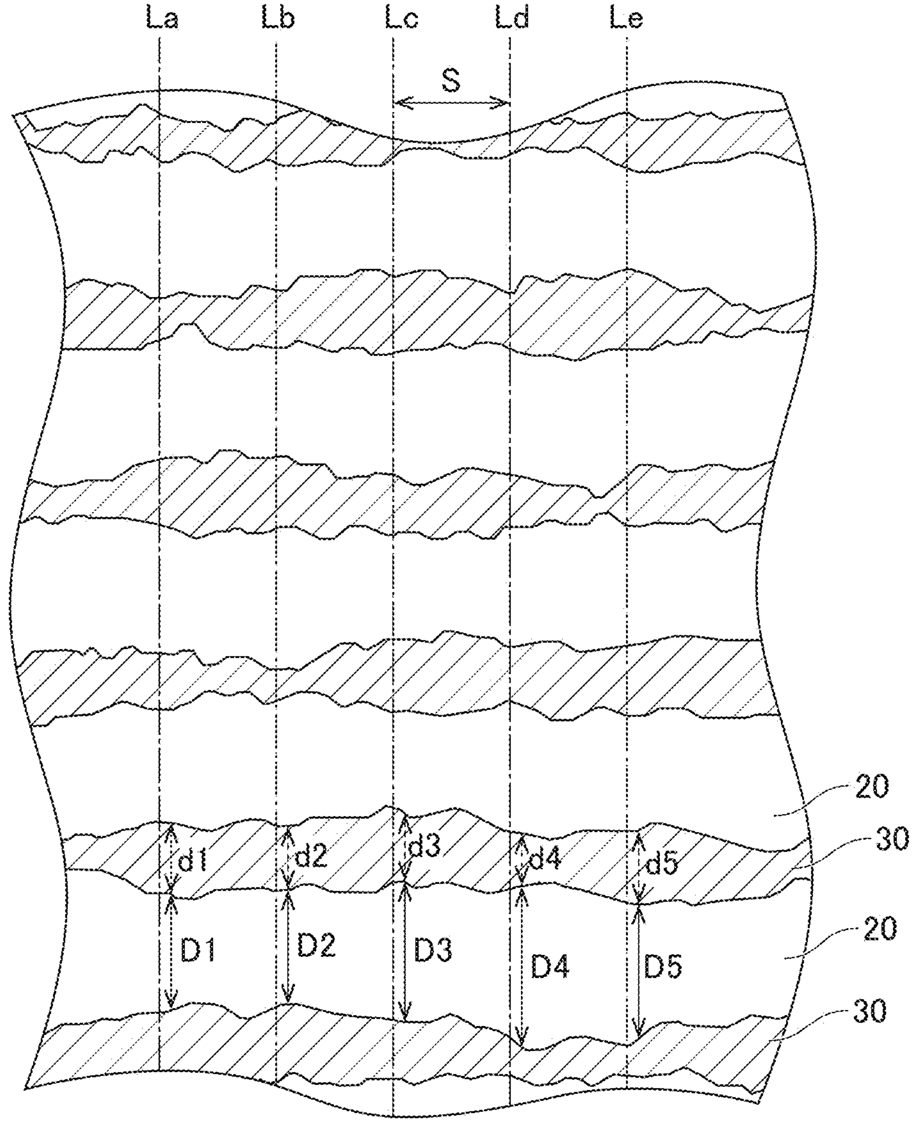
FIG. 5 is an example of an enlarged cross section image of an exposed active layer portion.

Hereinafter, the method of measuring the thickness of the dielectric layers 20 will be described in detail with reference to FIG. 5. Since the methods of measuring the thickness of the dielectric layer 20 at the measurement target locations P1, P2A, and P2B are the same, only the measurement of P1 will be described. Here, a case where the thickness of each of the internal electrode layers 30 is measured in addition to the thickness of each of the dielectric layers 20 will be described.

The thickness of each of the internal electrode layers 30 is measured as follows. FIG. 5 is an example of an enlarged image of an active layer portion cross section exposed at the position of the measurement target location P1. For example, in the enlarged image shown in the drawings, a plurality of straight lines La, Lb, Lc, Ld, and Le extending in the height direction (the lamination direction T) are drawn at equal or substantially equal intervals at a pitch S. The pitch S is, for example, preferably about 5 times to about 10 times the thickness of the internal electrode layer 30 to be measured. For example, in a case where an internal electrode layer 30 having a thickness of about 1 μm is measured, the pitch S is set to be about 5 μm.

Next, the thicknesses d1, d2, d3, d4, and d5 of the respective internal electrode layers 30 are measured on the respective straight lines of the five straight lines La, Lb, Lc, Ld, and Le, and the average value thereof is defined as the thickness of one internal electrode layer 30 in the height direction T. However, when the internal electrode layer 30 is missing on the straight lines La, Lb, Lc, Ld, and Le and the dielectric layers 20 sandwiching the internal electrode layer 30 are connected to each other, or when the enlarged view of the measurement location is unclear, a new straight line is drawn to measure the thickness of the internal electrode layer 30. This operation is performed on ten internal electrode layers 30, and the average value thereof is defined as the average thickness in the height direction T of the internal electrode layers 30 of the present example embodiment.

The thickness of the dielectric layer 20 is also measured in the same manner as the internal electrode layer 30. In each of the five straight lines La, Lb, Lc, Ld, and Le, the thicknesses D1, D2, D3, D4, and D5 of the dielectric layers 20 are measured, and the average value thereof is defined as the thickness of one dielectric layer 20. This operation is performed on ten dielectric layers 20, and the average value thereof is set as the average thickness in the height direction T of the dielectric layers 20 of the present example embodiment. The minimum thickness of the dielectric layer 20 in the height direction T is calculated as "average value−3σ". For the middle active layer portion 11EC, these values are calculated using the data of the thicknesses of the ten dielectric layers at the location of the measurement target location P1 described above. For the first lateral surface-side active layer portion 11E1 and the second lateral surface-side active layer portion 11E2 (lateral surface-side active layer portions), these values are calculated using data of the thicknesses of a total of 20 dielectric layers at the locations of the above-described measurement target locations P2A and P2B.

Next, an example of a method of manufacturing the multilayer ceramic capacitor 1 of the present example embodiment will be described.

A dielectric sheet for manufacturing the dielectric layers 20 and an electrically conductive paste for manufacturing the internal electrode layers 30 are prepared. The electrically conductive paste for manufacturing the dielectric sheet and the internal electrode includes a binder and a solvent. The binder and the solvent may be known.

An electrically conductive paste for manufacturing the internal electrode layers 30 is printed on the dielectric sheet in a predetermined pattern by, for example, screen printing or gravure printing. Thus, the dielectric sheet on which the pattern of the first internal electrode layers 31 is formed and the dielectric sheet on which the pattern of the second internal electrode layer 32 is formed are prepared.

By laminating a predetermined number of dielectric sheets on which the pattern of the internal electrode layer is not printed, a portion defining and functioning as the first main surface-side outer layer portion 12 adjacent to the first main surface TS1 is formed. A dielectric sheet on which the pattern of the first internal electrode layer 31 is printed and a dielectric sheet on which the pattern of the second internal electrode layer 32 is printed are sequentially laminated thereon, such that a portion defining and functioning as the inner layer portion 11 is formed. A predetermined number of dielectric sheets on which the pattern of the internal electrode layer is not printed are laminated on the portion defining and functioning as the inner layer portion 11, such that a portion defining and functioning as the second main surface-side outer layer portion 13 adjacent to the second main surface TS2 is formed. In this way, a multilayer sheet is manufactured.

A multilayer block is produced by pressing the multilayer sheet in the height direction T by isostatic pressing, for example. In the present example embodiment, the thickness of each of the dielectric layers 20 adjacent to the lateral surface is relatively small. For example, the thickness and hardness of the rubber used in the isostatic pressing are adjusted so as to achieve the configuration of the present application. Specifically, the thickness of the rubber used in the isostatic pressing is increased. Alternatively, the hardness of the rubber used in the isostatic pressing is made harder than usual. As a result, the thickness of each of the dielectric layers 20 adjacent to the lateral surface becomes relatively thin.

The multilayer chip is cut out by cutting the multilayer block into a predetermined size. At this time, corner portions and ridge lines of the multilayer chip may be rounded by barrel polishing or the like.

The step of firing the multilayer chip includes a provisional firing step and a main firing step. In the provisional firing step, first, the multilayer chip is placed on a firing setter, and the binder included in the multilayer chip is removed by heating. Here, the organic binder included in the ceramic green sheet defining and functioning as the dielectric sheet of the multilayer chip and the electrically conductive paste for manufacturing the internal electrode layers 30 is removed. The furnace atmosphere in the firing step is an air atmosphere. However, the amount of gas such as, for example, $N_2$, $H_2$, or $H_2O$ may be adjusted. The firing temperature at this time is, for example, preferably about 150° C. or higher and about 400° C. or lower.

Next, in the main firing step, the multilayer chip placed on the firing setter after firing is placed in a firing furnace, and the temperature in the furnace is set to, for example, about 600° C. or higher and about 1400° C. or lower to perform firing. At this time, the particle size is adjusted at a temperature increase rate of, for example, about 1° C./min to about 6000° C./min. In addition, for example, a gas amount of $N_2$, $H_2$, $H_2O$, or the like is adjusted in the furnace. Thus, a multilayer body can be obtained.

Here, in the present example embodiment, the multilayer chip is fired to produce the multilayer body 10, and the multilayer chip is fired in a reducing atmosphere in order to make the particles adjacent to the lateral surface relatively large. For example, the oxygen partial pressure at the time of firing is adjusted so as to achieve the configuration of the present application. Specifically, firing is performed in an atmosphere in which the oxygen partial pressure is lower than usual. As a result, the particles adjacent to the lateral surface which are in direct contact with the atmosphere in which the oxygen partial pressure is reduced are relatively large.

An electrically conductive paste to form base electrode layers (the first base electrode layer 50A and the second base electrode layer 50B) is applied to both end surfaces of the multilayer body 10. Thereafter, a firing process is performed to form base electrode layers. In the present example embodiment, the base electrode layers are fired layers. An electrically conductive paste including a glass component and a metal is applied to the multilayer body 10 by a method such as dipping, for example. Thereafter, a firing process is performed to form base electrode layers. The temperature of the firing treatment at this time is, for example, preferably about 700° C. or more and about 900° C. or less. When each of the base electrode layers is a fired layer, the fired layer may include a ceramic component. In this case, the fired layer may include a ceramic component instead of the glass component, or may include both of them.

As the ceramic material to be added at this time, it is particularly preferable to use the same type of ceramic material as the dielectric layers 20. In this case, it is preferable that an electrically conductive paste is applied to the multilayer chip before firing, and the multilayer chip and the electrically conductive paste applied to the multilayer chip are simultaneously fired to form the multilayer body 10 including the fired layers. The temperature of the firing treatment (firing temperature) at this time is, for example, preferably about 900° C. or more and about 1400° C. or less.

Thereafter, a plated layer is formed on the surface of each of the base electrode layers. In the present example embodiment, the first plated layer 60A is formed on the surface of the first base electrode layer 50A. The second plated layer 60B is formed on the surface of the second base electrode layer 50B. In the present example embodiment, for example, a Ni plated layer and a Sn plated layer are formed as the plated layers. When plating is performed, either electrolytic plating or electroless plating may be used. However, electroless plating requires pretreatment with a catalyst or the like in order to improve the plating deposition rate, and thus has a disadvantage in that the process becomes complicated. Therefore, in general, electrolytic plating is preferably used. The Ni plated layer and the Sn plated layer are sequentially formed by barrel plating, for example.

When the base electrode layer is a thin film layer, masking or the like is performed to form a thin film layer defining and functioning as the base electrode layer in a portion where the external electrode is to be formed. The thin film layer is formed by a thin film forming method such as sputtering or vapor deposition, for example. The thin film layer is, for example a layer of about 1.0 μm or less on which metal particles are deposited.

When the electrically conductive resin layer is provided as the base electrode layer, the electrically conductive resin layer may be provided so as to cover the fired layer, or may be provided directly on the multilayer body 10 without providing the fired layer. When the electrically conductive resin layer is provided, an electrically conductive resin paste including a thermosetting resin and a metal component is applied onto the fired layer or the multilayer body 10, and then heat-treated at a temperature of, for example, about 250° C. to about 550° C. or higher. Thus, the thermosetting resin is thermally cured to form the electrically conductive resin layer. The atmosphere during this heat treatment is, for example, preferably an $N_2$ atmosphere. In addition, in order to prevent scattering of the resin and oxidation of various metal components, the oxygen concentration is, for example, preferably about 100 ppm or less.

The plated layer may be directly provided on the exposed portion of the internal electrode layer 30 of the multilayer body 10 without providing the base electrode layer. In this case, plating is performed on the first end surface LS1 and the second end surface LS2 of the multilayer body 10, such that a plated layer is formed on the exposed portion of the internal electrode layer 30. When plating is performed, either electrolytic plating or electroless plating may be used. However, electroless plating requires pretreatment with a catalyst or the like in order to improve the plating deposition rate, and thus has a disadvantage in that the process becomes complicated. Therefore, in general, electrolytic plating is preferably used. As the plating method, barrel plating is preferably used. If necessary, an upper plated layer formed on the surface of the lower plated layer may be formed by the same method as the lower plated layer.

Through such a manufacturing process, the multilayer ceramic capacitor 1 is manufactured.

EXAMPLES

By using the manufacturing method according to the above example embodiment, multilayer ceramic capacitors were manufactured as samples of the Examples. In the preparation of the samples of the Examples, the thickness of the rubber used in the isostatic pressing was adjusted. Specifically, a rubber having a thickness thicker than usual was used. In the preparation of the samples of Examples, the oxygen partial pressure during firing was adjusted. Specifically, firing was performed in an atmosphere in which the oxygen partial pressure was lower than usual. The specifications of the multilayer ceramic capacitors are as follows.

Dimensions of a multilayer ceramic capacitor: about 1.68 mm (length direction L)×about 0.87 mm (width direction W)×about 0.88 mm (thickness direction T)

Ceramic material: $SrBaZrO_3$

Capacitance: about 100 nF

Material of internal electrode: Ni

By using the manufacturing method according to the above-described example embodiment, multilayer ceramic capacitors each having a specification processed under the following conditions were manufactured as samples of the Comparative Examples. The specifications of the multilayer ceramic capacitors of Comparative Example 1 and Comparative Example 2 are as follows. Comparative Example 1: A rubber having a thickness thinner than usual was used. In addition, firing was performed in an atmosphere in which the oxygen partial pressure during firing was higher than usual. Comparative Example 2: A rubber having a thickness thinner than usual was used. In addition, firing was performed in an atmosphere in which the oxygen partial pressure during firing was lower than usual.

Dimensions of each of multilayer ceramic capacitors: about 1.68 mm (length direction L)×about 0.87 mm (width direction W)×about 0.88 mm (thickness direction T)

Ceramic material: $SrBaZrO_3$

Capacitance: about 100 nF

Internal electrode: Ni

Next, the samples of the Examples and Comparative Examples were subjected to a moisture resistance reliability test and a high temperature reliability test. In addition, measurements of the particle size of the ceramic material in the dielectric layer and the thickness of the dielectric layer were performed by the above-described measurement methods on 10 samples of the samples manufactured in the same lot. The measured values of the particle size and the thickness are the average values of 10 samples.

As a moisture resistance reliability test, a moisture resistance test was performed on each sample based on the PCBT test method. More specifically, each sample was mounted on a wiring board using eutectic solder, and the resulting product was placed in a high-temperature and high-humidity bath having a temperature of about 125° C. and a relative humidity of about 95% RH, a direct current of about 25 V was applied between a pair of external electrodes, and this state was maintained for about 72 hours. Then, a case where the number of samples in which the insulation resistance value did not decrease by two or more digits before and after the test was 0 was determined as "0" (circle symbol), and a case where the number of samples in which the insulation resistance value decreased by two or more digits before and after the test was 20 or more was determined as "X" (cross symbol). Thirty-six samples of each of the Examples and the Comparative Examples were prepared.

As the high-temperature reliability test, a high-temperature load test was performed on each sample based on the HALT test method. More specifically, each sample was set in a dedicated jig as a single piece, and the sample was placed in a high-temperature bath at a temperature of about 150° C., a direct current of about 100 V was applied between a pair of external electrodes, and this state was maintained for about 100 hours. Then, when 0 samples failed during the test, it was judged as "0" (circle symbol), when 1 to 5 samples failed during the test, it was judged as "A" (triangle symbol), and when 6 or more samples failed during the test, it was judged as "X" (cross symbol). Thirty-six samples were tested for each of Examples and Comparative Examples.

Hereinafter, the measurement data of the thickness of the dielectric layer and the particle size of the ceramic material in the dielectric layer, and the results of the moisture resistance reliability test and the high temperature reliability test for the samples of the Examples and the Comparative Examples will be summarized.

TABLE 1

| | A AVERAGE THICKNESS OF DIELECTRIC LAYERS IN LATERAL SURFACE-SIDE ACTIVE LAYER PORTION (μm) | B AVERAGE THICKNESS OF DIELECTRIC LAYERS IN MIDDLE ACTIVE LAYER PORTION (μm) | C AVERAGE PARTICLE SIZE OF CERAMIC MATERIAL IN DIELECTRIC LAYERS IN LATERAL SURFACE-SIDE ACTIVE LAYER PORTION (μm) | D AVERAGE PARTICLE SIZE OF CERAMIC MATERIAL IN DIELECTRIC LAYERS IN MIDDLE ACTIVE LAYER PORTION (μm) | F (MINIMUM OF A) MINIMUM THICKNESS OF DIELECTRIC LAYER IN LATERAL SURFACE-SIDE INNER LAYER PORTION (μm) | F (MAXIMUM OF C) MAXIMUM PARTICLE SIZE OF CERAMIC MATERIAL IN DIELECTRIC LAYER IN LATERAL SURFACE-SIDE INNER LAYER PORTION (μm) | E/F E/F |
|---|---|---|---|---|---|---|---|
| Example 1 | 1.11 | 1.28 | 0.71 | 0.47 | 0.78 | 1.13 | 0.69 |
| Example 2 | 1.12 | 1.29 | 0.53 | 0.43 | 0.82 | 0.99 | 0.83 |
| Example 3 | 1.16 | 1.28 | 0.59 | 0.44 | 0.83 | 0.81 | 1.02 |
| Example 4 | 1.17 | 1.29 | 0.42 | 0.3 | 0.84 | 0.64 | 1.31 |
| Example 5 | 1.19 | 1.27 | 0.25 | 0.18 | 0.86 | 0.47 | 1.82 |

TABLE 1-continued

| | | | | | | | |
|---|---|---|---|---|---|---|---|
| Comparative Example 1 | 1.12 | 1.02 | 0.66 | 0.7 | 0.79 | 1.1 | 0.72 |
| Comparative Example 2 | 1.36 | 1.29 | 0.51 | 0.45 | 1.03 | 0.93 | 1.11 |

| | MOISTURE RESISTANCE RELIABILITY | | HIGH TEMPERATURE RELIABILITY | | COMPREHENSIVE |
|---|---|---|---|---|---|
| | RESULT | DETERMINATION | RESULT | DETERMINATION | DETERMINATION |
| Example 1 | 0/36 | ○ | 2/36 | Δ | Δ |
| Example 2 | 0/36 | ○ | 0/36 | ○ | ○ |
| Example 3 | 0/36 | ○ | 0/36 | ○ | ○ |
| Example 4 | 0/36 | ○ | 0/36 | ○ | ○ |
| Example 5 | 0/36 | ○ | 0/36 | ○ | ○ |
| Comparative Example 1 | 29/36 | x | 8/36 | x | x |
| Comparative Example 2 | 36/36 | x | 0/36 | ○ | x |

From the above results, in Examples 1 to 5 which are samples in which the average thickness A in the height direction T of the dielectric layers present inside the lateral surface-side active layer portion was smaller than the average thickness B in the height direction T of the dielectric layers present inside the middle active layer portion, the results of the moisture resistance reliability test were good. On the other hand, in Comparative Examples 1 and 2, which are samples in which the average thickness A in the height direction T of the dielectric layers present inside the lateral surface-side active layer portion was thicker than the average thickness B in the height direction T of the dielectric layers present inside the middle active layer portion, the results of the moisture resistance reliability test were not good.

In addition, in Examples 1 to 5, which are samples in which the average particle size C of the ceramic material in the dielectric layers present inside the lateral surface-side active layer portion was larger than the average particle size D of the ceramic material in the dielectric layers present inside the middle active layer portion, the results of the high temperature reliability test were good. On the other hand, in Comparative Example 1, which is a sample in which the average particle size C of the ceramic material in the dielectric layers present in the lateral surface-side active layer portion was larger than the average particle size D of the ceramic material in the dielectric layers present in the middle active layer portion, the results of the high temperature reliability test were not satisfactory.

Further, in Examples 2 to 5 of the samples in which the ratio E/F of the minimum thickness E in the height direction T of the dielectric layers present in the inside of the lateral surface-side active layer portion to the maximum particle size F of the ceramic material in the dielectric layers present in the inside of the lateral surface-side active layer portion was, for example, about 0.83 or more and about 1.82 or less, the results of the high temperature reliability test were better than the result of Example 1, which was a sample outside the range.

From the above, it is evident that it is possible to improve both the moisture resistance and the high temperature reliability by making the average thickness in the height direction T of the dielectric layers present inside the lateral surface-side active layer portion smaller than the average thickness in the height direction T of the dielectric layers present inside the middle active layer portion, and making the average particle size of the ceramic material in the dielectric layers present inside the lateral surface-side active layer portion larger than the average particle size of the ceramic material in the dielectric layers present inside the middle active layer portion.

From the above results, according to the multilayer ceramic capacitor 1 of the present example embodiment, the following advantageous effects are achieved.

(1) The multilayer ceramic capacitor 1 according to the present example embodiment includes the multilayer body 10. The multilayer body 10 includes the plurality of dielectric layers 20 and the plurality of internal electrode layers 30 laminated therein, the first main surface TS1 and the second main surface TS2 opposed to each other in the height direction T, the first lateral surface WS1 and the second lateral surface WS2 opposed to each other in the width direction W orthogonal or substantially orthogonal to the height direction T, the first end surface LS1 and the second end surface LS2 opposed to each other in the length direction L orthogonal or substantially orthogonal to the height direction T and the width direction W, and the active layer portion 11E including the plurality of internal electrode layers 30 opposed to each other in the height direction T with a corresponding one of the plurality of dielectric layers 20 interposed therebetween. The plurality of dielectric layers 20 each include a ceramic material. The active layer portion 11E includes the first lateral surface-side edge 11ES1 that is adjacent to the first lateral surface WS1 and extends in the height direction T, the second lateral surface-side edge 11ES2 that is adjacent to the second lateral surface WS2 and extends in the height direction T, the first lateral surface-side active layer portion 11E1 that includes a region from the first lateral surface-side edge 11ES1 toward an inside of the active layer portion 11E in the width direction W, the second lateral surface-side active layer portion 11E2 that includes a region from the second lateral surface-side edge 11ES2 toward the inside of the active layer portion 11E in the width direction W, and the middle active layer portion 11EC that includes a region in a vicinity of a middle portion of the active layer portion 11E in the width direction W. An average thickness in the height direction T of the plurality of dielectric layers 20 inside the first lateral surface-side active layer portion 11E1 and the second lateral surface-side active layer portion 11E2 is smaller than an average thickness in the height direction T of the plurality of dielectric layers 20 inside the middle active layer portion 11EC, and an average particle size of the ceramic material in the plurality of dielectric layers 20 inside the first lateral surface-side active layer portion 11E1 and the second lateral surface-side active layer portion 11E2 is larger than an average particle size of the ceramic material in the plurality of dielectric layers 20 inside the middle active layer portion 11EC.

In the related art, multilayer ceramic capacitors have been known. In general, multilayer ceramic capacitors each include a ceramic sintered body made of a dielectric ceramic such as barium titanate, for example. Such a ceramic sintered body includes therein a plurality of internal electrodes which overlap with each other with a ceramic layer interposed therebetween. Further, external electrodes are provided on one end surface and the other end surface of the ceramic sintered body to provide an electrical connection with the plurality of internal electrodes.

In such multilayer ceramic capacitors, when the thickness in the height direction T of the dielectric layers present inside the lateral surface-side active layer portion is thicker than the thickness in the height direction T of the dielectric layers present inside the middle active layer portion, since the multilayer ceramic capacitor is not appropriately compressed, a large number of pores (bubbles) are present inside the lateral surface-side active layer portion, such that the denseness of the dielectric layers inside the lateral surface-side active layer portion is lowered, and the moisture resistance reliability is lowered.

Here, in the present example embodiment, as described above, the thickness in the height direction T of the dielectric layers present inside the lateral surface-side active layer portion is made thinner than the thickness in the height direction T of the dielectric layers present inside the middle active layer portion. With such a configuration, it is possible to improve the denseness of the lateral surface-side active layer portion, and it is possible to reduce or prevent the infiltration of moisture into the multilayer body. As a result, it is possible to improve the moisture resistance reliability of the multilayer ceramic capacitors.

Further, in the present example embodiment, the particle size of the ceramic material in the dielectric layers inside the lateral surface-side active layer portion is set to be larger than the particle size of the ceramic material in the dielectric layers present inside the middle active layer portion.

When the particle size increases, it is considered that the generation of an additive segregation phase can be reduced or prevented. This is because it is considered that, when the particle size increases, the grain boundary decreases, and thus the generation of the additive segregation phase of the low resistance layer which is likely to segregate at the grain boundary can be reduced or prevented. As a result, it is considered that electric field concentration can be reduced or prevented, such that the high-temperature reliability can be improved.

As described above, it is possible to improve the high-temperature reliability by appropriately adjusting the number of ceramic particles in one dielectric layer and dispersing the electric field in one dielectric layer, while improving the denseness of the lateral surface-side active layer portion and improving the moisture resistance by controlling the thickness of the dielectric layer and the ceramic particle size.

Therefore, according to example embodiments of the present invention, it is possible to provide multilayer ceramic capacitors that are each able to improve both moisture resistance and high-temperature reliability by controlling the thickness of a region where the thickness of the dielectric element is reduced and the ceramic particle size.

(2) In the present example embodiment, a ratio of a minimum thickness in the height direction T of the plurality of dielectric layers 20 inside of each of the first lateral surface-side active layer portion 11E1 and the second lateral surface-side active layer portion 11E2 relative to a maximum particle size of the ceramic material in the plurality of dielectric layers 20 present in the inside of each of the first lateral surface-side active layer portion 11E1 and the second lateral surface-side active layer portion 11E2 is, for example, about 0.83 or more and about 1.82 or less. Accordingly, it is possible to maintain the number of particles in one dielectric layer in the lateral surface-side active layer portion appropriately, and it is possible to make a more uniform electric field distribution in the layer of the lateral surface-side active layer portion. As a result, it is possible to further improve the high-temperature reliability.

(3) In the present example embodiment, the ceramic material in each of the plurality of dielectric layers 20 includes a perovskite structure including, for example, Ba, Sr, Zr, Ti, Hf, and Si, and optionally including Ca. This makes it possible to reduce the thickness of each of the dielectric layers 20, and even when the thickness is reduced, it is still possible to obtain an excellent insulation degradation life and moisture load life with a high electric field.

Modification

For example, the configuration of each of the multilayer ceramic capacitor 1 is not limited to the configurations shown in FIGS. 1 to 4. For example, the multilayer ceramic capacitor 1 may be a multilayer ceramic capacitor having a two-portion structure as shown in FIG. 6.

Figure 6:
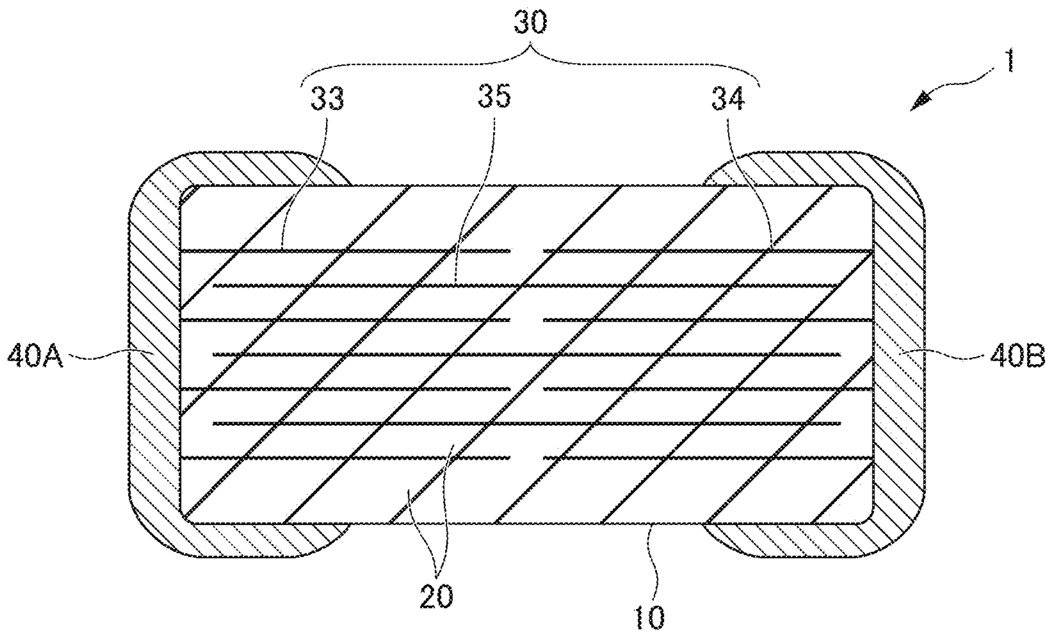
FIG. 6 is a diagram showing a multilayer ceramic capacitor having a two-portion structure.

The multilayer ceramic capacitor 1 shown in FIG. 6 is a multilayer ceramic capacitor 1 including a two-portion structure, and includes, as the internal electrode layers 30, floating internal electrode layers 35, in addition to the first internal electrode layers 33 and the second internal electrode layers 34. Each of the floating internal electrode layers 35 is not exposed at either of the first end surface LS1 and the second end surface LS2. As described above, by providing the floating internal electrode layers 35 as the internal electrode layers 30, the multilayer ceramic capacitor 1 includes a configuration in which the active layer portion is divided into a plurality of portions. As a result, a plurality of capacitor components are provided between the internal electrode layers 30 which are opposed to each other, and these capacitor components are connected in series. Therefore, the voltage applied to each capacitor component is reduced, and the breakdown voltage of the multilayer ceramic capacitor 1 can be increased.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:

a multilayer body including:

a plurality of dielectric layers and a plurality of internal electrode layers laminated therein;

a first main surface and a second main surface opposed to each other in a height direction;

a first lateral surface and a second lateral surface opposed to each other in a width direction orthogonal or substantially orthogonal to the height direction;

a first end surface and a second end surface opposed to each other in a length direction orthogonal or substantially orthogonal to the height direction and the width direction; and an active layer portion including the plurality of internal electrode layers opposed to each other in the height direction with a corresponding one of the plurality of dielectric layers interposed therebetween; wherein the plurality of dielectric layers each include a ceramic material;

the active layer portion includes:

a first lateral surface-side edge adjacent to the first lateral surface and extending in the height direction;

a second lateral surface-side edge adjacent to the second lateral surface and extending in the height direction;

a first lateral surface-side active layer portion including a region from the first lateral surface-side edge toward an inside of the active layer portion in the width direction;

a second lateral surface-side active layer portion including a region from the second lateral surface-side edge toward the inside of the active layer portion in the width direction; and a middle active layer portion including a region in a vicinity of a middle portion of the active layer portion in the width direction;

an average thickness in the height direction of the plurality of dielectric layers inside the first lateral surface-side active layer portion and the second lateral surface-side active layer portion is smaller than an average thickness in the height direction of the plurality of dielectric layers inside the middle active layer portion;

an average particle size of the ceramic material in the plurality of dielectric layers inside the first lateral surface-side active layer portion and the second lateral surface-side active layer portion is larger than an average particle size of the ceramic material in the plurality of dielectric layers inside the middle active layer portion; and a ratio of a minimum thickness in the height direction of the plurality of dielectric layers inside of each of the first lateral surface-side active layer portion and the second lateral surface-side active layer portion relative to a maximum particle size of the ceramic material in the plurality of dielectric layers inside of each of the first lateral surface-side active layer portion and the second lateral surface-side active layer portion is about 0.83 or more and about 1.82 or less.

2. The multilayer ceramic capacitor according to claim 1, wherein the ceramic material in each of the plurality of dielectric layers includes a perovskite structure including Ba, Sr, Zr, Ti, Hf, and Si.

3. The multilayer ceramic capacitor according to claim 2, wherein the ceramic material in each of the plurality of dielectric layers includes Ca.

4. The multilayer ceramic capacitor according to claim 3, wherein a number of moles of Sr/(number of moles of Ba+number of moles of Ca+number of moles of Sr) is from about 0.6 to about 0.95.

5. The multilayer ceramic capacitor according to claim 3, wherein (number of moles of Ba+number of moles of Ca+number of moles of Sr)/(number of moles of Zr+number of moles of Ti+number of moles of Hf) is about 1.00 or more and about 1.03 or less.

6. The multilayer ceramic capacitor according to claim 2, wherein a number of moles of Zr/(number of moles of Zr+number of moles of Ti+number of moles of Hf) is from about 0.9 to about 0.98.

7. The multilayer ceramic capacitor according to claim 1, wherein a thickness of each of the plurality of dielectric layers is about 0.7 μm or more and about 2.5 μm or less.

8. The multilayer ceramic capacitor according to claim 1, wherein a number of the plurality of dielectric layers is 10 or more and 1500 or less.

9. The multilayer ceramic capacitor according to claim 1, wherein each of the plurality of internal electrode layers includes Ni, Cu, Ag, Pd or Au, or an alloy including at least one of Ni, Cu, Ag, Pd or Au.

10. The multilayer ceramic capacitor according to claim 1, wherein a thickness of each of the plurality of internal electrode layers is about 0.2 μm or more and about 1.5 μm or less.

11. The multilayer ceramic capacitor according to claim 1, wherein a number of the plurality of internal electrode layers is 10 or more and 1500 or less.

12. The multilayer ceramic capacitor according to claim 1, wherein Sn is provided at an interface between the plurality of internal electrode layers and the plurality of dielectric layers.

13. The multilayer ceramic capacitor according to claim 1 further comprising:

a first external electrode on the first end surface; and a second external electrode on the second end surface.

14. The multilayer ceramic capacitor according to claim 13, wherein the first external electrode extends from the first end surface to portions of the first and second main surfaces and portions of the first and second lateral surfaces; and the second external electrode extends from the second end surface to portions of the first and second main surfaces and portions of the first and second lateral surfaces.

15. The multilayer ceramic capacitor according to claim 13, wherein each of the first and second external electrodes includes a base electrode layer and a plated layer on the base electrode layer.

16. The multilayer ceramic capacitor according to claim 15, wherein the base electrode layer is a fired layer including a metal component and a glass component.

17. The multilayer ceramic capacitor according to claim 16, wherein the metal component includes at least one of Cu, Ni, Ag, Pd, Ag—Pd alloys, or Au.

18. The multilayer ceramic capacitor according to claim 16, wherein the glass component includes at least one of B, Si, Ba, Mg, Al, or Li.

19. The multilayer ceramic capacitor according to claim 15, wherein a thickness of the base electrode layer on each of the first end surface and the second end surface is about 3 μm or more and about 160 μm or less in a middle portion of the first base electrode layer in the height direction and the width direction.

* * * * *